US010704661B2

(12) United States Patent
Gilmore

(10) Patent No.: US 10,704,661 B2
(45) Date of Patent: Jul. 7, 2020

(54) ACTUATOR DEVICE HAVING CAM AND FOLLOWER AND CONTROLLER CONFIGURED TO EMPLOY RATE-BASED METHODOLOGY TO IDENTIFY POSITIONING OF FOLLOWER ON CAM AT PREDETERMINED LOCATION

(71) Applicant: American & Axle & Manufacturing, Inc., Detroit, MI (US)

(72) Inventor: Curt D. Gilmore, Fenton, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 360 days.

(21) Appl. No.: 15/724,400

(22) Filed: Oct. 4, 2017

(65) Prior Publication Data

US 2018/0023674 A1 Jan. 25, 2018

Related U.S. Application Data

(62) Division of application No. 14/260,613, filed on Apr. 24, 2014, now Pat. No. 9,803,731.

(51) Int. Cl.
*F16H 25/14* (2006.01)
*G01D 5/14* (2006.01)
*F16H 25/12* (2006.01)
*B60K 23/08* (2006.01)

(52) U.S. Cl.
CPC .......... *F16H 25/14* (2013.01); *F16H 25/125* (2013.01); *G01D 5/145* (2013.01); *B60K 2023/0858* (2013.01); *B60Y 2400/414* (2013.01)

(58) Field of Classification Search
CPC ................. F16H 25/114; F16H 25/125; B60Y 2400/414; B60K 2023/0858
See application file for complete search history.

(56) References Cited

U.S. PATENT DOCUMENTS

| 4,413,396 | A | 11/1983 | Wallace et al. |
| 6,173,624 | B1 | 1/2001 | Decker |
| 6,314,817 | B1 | 11/2001 | Lindback |
| 6,771,065 | B2 | 8/2004 | Pointer |
| 7,023,200 | B2 | 4/2006 | Spellman, Jr. |

(Continued)

FOREIGN PATENT DOCUMENTS

WO    WO-2012138953 A2    10/2012

*Primary Examiner* — Gregory J Toatley, Jr.
*Assistant Examiner* — Lynda Dinh
(74) *Attorney, Agent, or Firm* — Burris Law, PLLC

(57) ABSTRACT

An actuator device having a motor driven cam, a follower coupled to an output member and driven by the cam, and a controller for controlling operation of the motor. The cam has a first cam surface, a second cam surface and a lift portion between the first and second cam surfaces. The controller is configured to identify a predetermined point on the lift portion as the follower is moved relative to the cam along the lift portion toward the second cam surface. The controller identifies the predetermined point based on a rate of change in the position of the output member along an output member axis as a function of the rotational position of the cam about a cam axis. The controller controls operation of the motor based on the predetermined point to position the follower on the second cam surface.

16 Claims, 3 Drawing Sheets

(56) References Cited

U.S. PATENT DOCUMENTS

| | | |
|---|---|---|
| 7,304,450 B2 * | 12/2007 | Prudham ................ F02D 11/10 318/700 |
| 7,307,415 B2 | 12/2007 | Seger et al. |
| 8,947,076 B2 | 2/2015 | Bogos et al. |
| 2010/0100294 A1 | 4/2010 | Hirao et al. |
| 2012/0105057 A1 | 5/2012 | Mol |
| 2012/0217118 A1 | 8/2012 | Nedachi |

* cited by examiner

ACTUATOR DEVICE HAVING CAM AND FOLLOWER AND CONTROLLER CONFIGURED TO EMPLOY RATE-BASED METHODOLOGY TO IDENTIFY POSITIONING OF FOLLOWER ON CAM AT PREDETERMINED LOCATION

CROSS-REFERENCE TO RELATED APPLICATIONS

This application is a divisional of U.S. patent application Ser. No. 14/260,613 filed on Apr. 24, 2014. The entire disclosure of the above application is incorporated herein by reference.

FIELD

The present disclosure relates to an actuator device having a cam, a follower and a controller that is configured to employ a rate-based methodology to identify the positioning of the follower on the cam at a predetermined location.

BACKGROUND

This section provides background information related to the present disclosure which is not necessarily prior art.

U.S. application Ser. No. 14/009,120 entitled "Two Position Actuator With Sensing And Control" discloses an actuator that can be employed to shift a mode clutch between an engaged position and a disengaged position. The actuator employs an electric motor that drives a shift cam to cause corresponding axial motion of a cam follower. The actuator includes a sensor that is configured to sense the (axial) position of the follower. The rotational position of the shift cam is based on the voltage of the electric power that is applied to the motor.

While such configuration is satisfactory for its intended purpose, such actuators remain susceptible to improvement.

SUMMARY

This section provides a general summary of the disclosure, and is not a comprehensive disclosure of its full scope or all of its features.

In one form, the present teachings provide an actuator device that includes an actuator assembly, a first sensor, a second sensor and a controller. The actuator assembly has a cam and follower assembly and an output member. The cam and follower assembly has a cam and a follower. The cam is rotatable about a cam axis and defines a cam profile with a first cam surface, a second cam surface and a lift portion that connects the first and second cam surfaces. The follower is engaged to the cam profile. The cam and follower assembly is drivingly coupled to the output member. The output member is positioned at a first axial position along an output member axis when the follower is disposed on the first cam surface. The output member is positioned at a second axial position along the output member axis when the follower is disposed on the second cam surface. The second axial position is offset from the first axial position along the output member axis. The first sensor is configured to generate a first sensor signal indicative of a rotational position of the cam about the cam axis. The second sensor is configured to generate a second sensor signal indicative of a position of the output member along the output member axis. The controller is coupled to the first and second sensors and receives the first and second sensor signals. The controller is configured to identify the positioning of the follower at a predetermined point on the lift portion as the follower is moved relative to the cam along the lift portion toward the second cam surface based on a rate of change in the position of the output member along the output member axis as a function of the rotational position of the cam about the cam axis.

In another form, the present teachings provide an actuator device having an actuator assembly and a controller. The actuator assembly has a cam and follower assembly, an output member and a motor. The cam and follower assembly has a cam and a follower. The cam is rotatable about a cam axis and defines a cam profile with a first cam surface, a second cam surface and a lift portion that connects the first and second cam surfaces. The follower is engaged to the cam profile. The cam and follower assembly is drivingly coupled to the output member. The output member is positioned at a first axial position along an output member axis when the follower is disposed on the first cam surface. The output member is positioned at a second axial position along the output member axis when the follower is disposed on the second cam surface. The second axial position is offset from the first axial position along the output member axis. The motor is coupled to the cam to drive the cam about the cam axis. The controller is configured to identify a predetermined point on the lift portion as the follower is moved relative to the cam along the lift portion toward the second cam surface. The controller identifies the predetermined point based on a rate of change in the position of the output member along the output member axis as a function of the rotational position of the cam about the cam axis. The controller controls operation of the motor based on the predetermined point to position the follower on the second cam surface.

In still another form, the present teachings provide a method that includes: providing an actuator assembly having a cam and follower assembly and an output member, the cam and follower assembly comprising a cam and a follower, the cam being rotatable about a cam axis and defining a cam profile having a first cam surface, a second cam surface and a lift portion that connects the first and second cam surfaces, the follower being engaged to the cam profile, the cam and follower assembly being drivingly coupled to the output member, wherein the output member is positioned at a first axial position along an output member axis when the follower is disposed on the first cam surface, wherein the output member is positioned at a second axial position along the output member axis when the follower is disposed on the second cam surface, the second axial position being offset from the first axial position along the output member axis; rotating the cam in a first rotational direction to drive the follower relative to the cam along the lift portion toward the second cam surface; determining a rate of change in the position of the output member along the output member axis as a function of the rotational position of the cam about the cam axis; and identifying the positioning of the follower on the lift portion at a predetermined point based on the rate of change.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
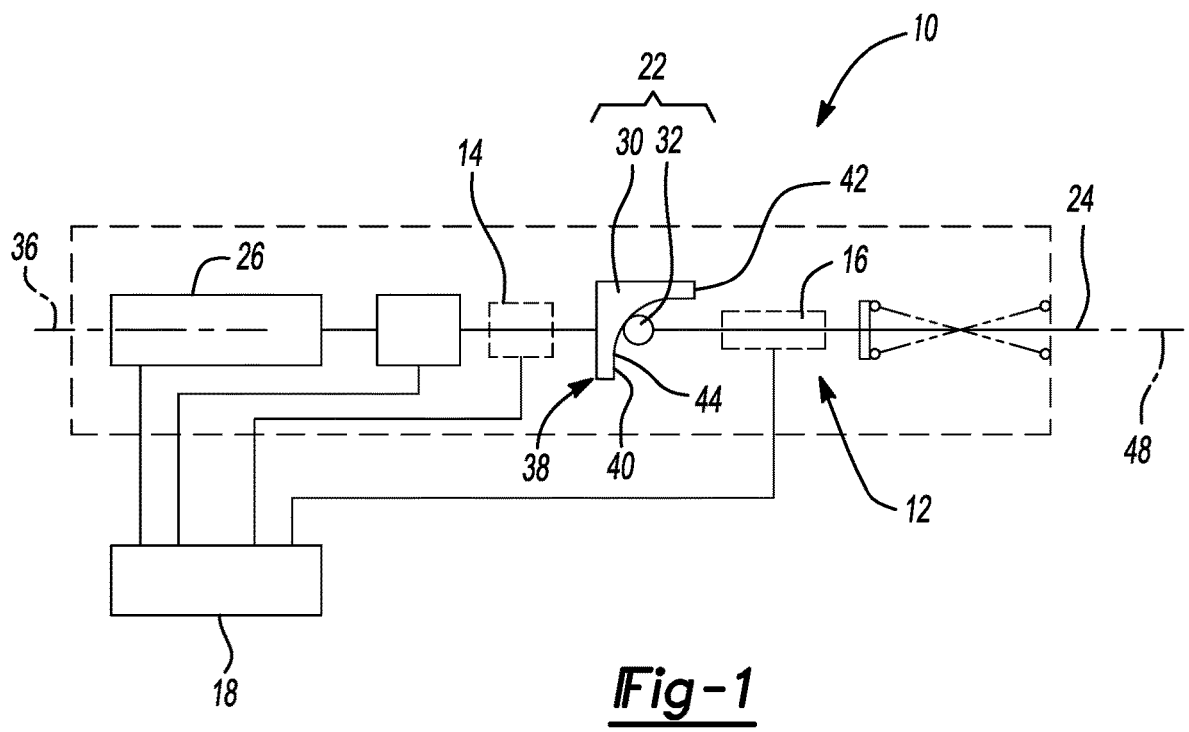
FIG. 1 is a schematic illustration of an actuator device constructed in accordance with the teachings of the present disclosure.

With reference to FIG. 1 of the drawings, an actuator device constructed in accordance with the teachings of the present disclosure is generally indicated by reference numeral 10. The actuator device 10 can include an actuator assembly 12, first and second sensors 14 and 16, respectively, and a controller 18. The actuator assembly 12 can include a cam and follower assembly 22, an output member 24 and a motor 26.

Figure 2:
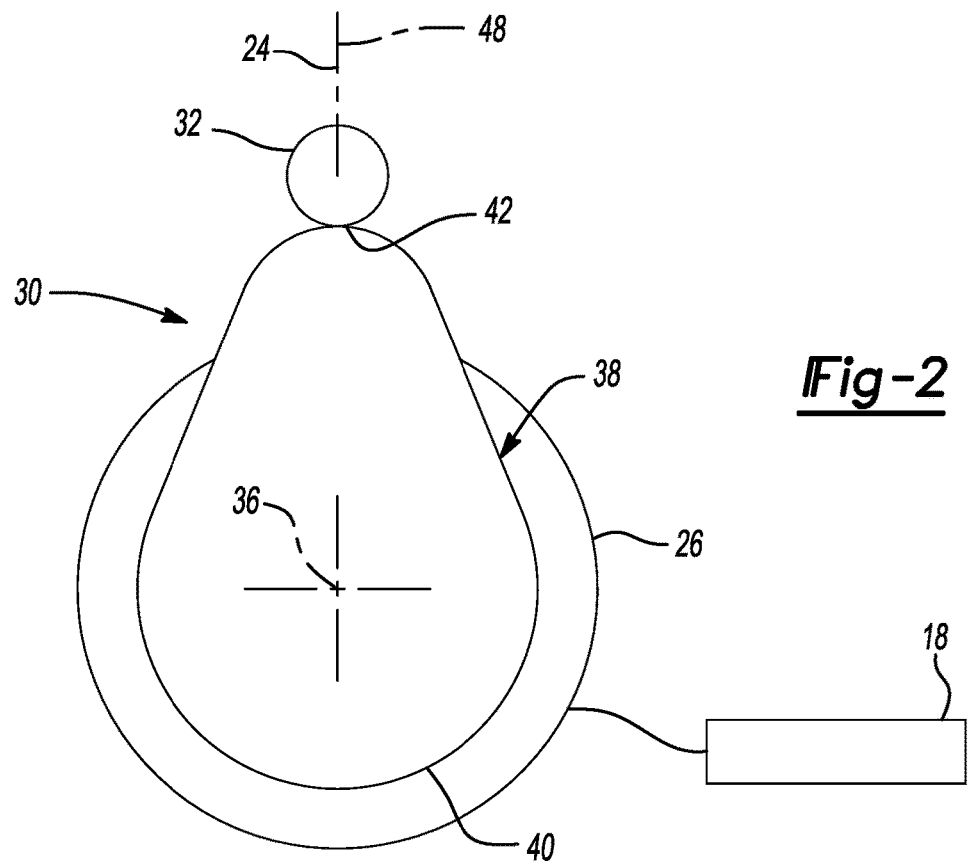
FIG. 2 is a schematic illustration of a portion of a second actuator device constructed in accordance with the teachings of the present disclosure.

The cam and follower assembly 22 can include a cam 30 and a follower 32. The cam 30 can be rotatable about a cam axis 36 and can define a cam profile 38 having a first cam surface 40, a second cam surface 42 and a lift portion 44 that connects the first and second cam surfaces 40 and 42. The follower 32 can be engaged to the cam profile 38 such that rotation of the cam 30 about the cam axis 36 can cause corresponding movement of the follower 32 along an output member axis 48. In the example provided, the output member axis 48 is disposed parallel to, such as coincident with, the cam axis 36. It will be appreciated, however, that various other orientations between the cam axis 36 and the output member axis 48 can be employed, such as a perpendicular arrangement between the output member axis 48 and the cam axis 36 that is shown in FIG. 2.

Returning to FIG. 1, the cam and follower assembly 22 can be drivingly coupled to the output member 24 such that movement of the follower 32 along the output member axis 48 causes corresponding movement of the output member 24 along the output member axis 48. The output member 24 can be positioned at a first axial position along the output member axis 48 when the follower 32 is disposed on the first cam surface 40. The output member 24 can be positioned at a second axial position along the output member axis 48 when the follower 32 is disposed on the second cam surface 42. The second axial position can be offset from the first axial position along the output member axis 48.

The motor 26 is coupled to the cam 30 and is configured to drive the cam 30 about the cam axis 36. In the particular example provided, the motor 26 is an electric motor, but those of skill in the art will appreciate that the motor 26 could be any type of motor, including a pneumatic or hydraulic motor.

The first sensor 14 can be configured to generate a first sensor signal indicative of a rotational position of the cam 30 about the cam axis 36. For example the first sensor 14 can be a Hall-effect sensor that can be mounted to an output shaft of the motor 26 or to the cam 30. The first sensor 14 need not be an "absolute position sensor" that is configured to identify the absolute rotational position of the cam 30 relative to a stationary datum. In the example provided, however, the first sensor 14 is a "relative position sensor" that is configured to sense incremental rotation of the cam 30 relative to a stationary datum. Those of skill in the art will appreciate that a relative position sensor is relatively less expensive than an absolute position sensor and that an absolute position sensor must be calibrated (so that the predetermined datum is properly associated with a corresponding point on the cam 30). It will be appreciated that other types of relative position sensors could be employed. For example, in situations where the motor 26 is operated at a constant rotational speed, the relative position sensor could be configured to time the operation of the motor 26 or to monitor the time in which the motor 26 is operated.

The second sensor 16 is configured to generate a second sensor signal indicative of a position of the output member 24 along the output member axis 48. For example, the second sensor 16 could comprise one or more Hall-effect sensors.

Figure 3:
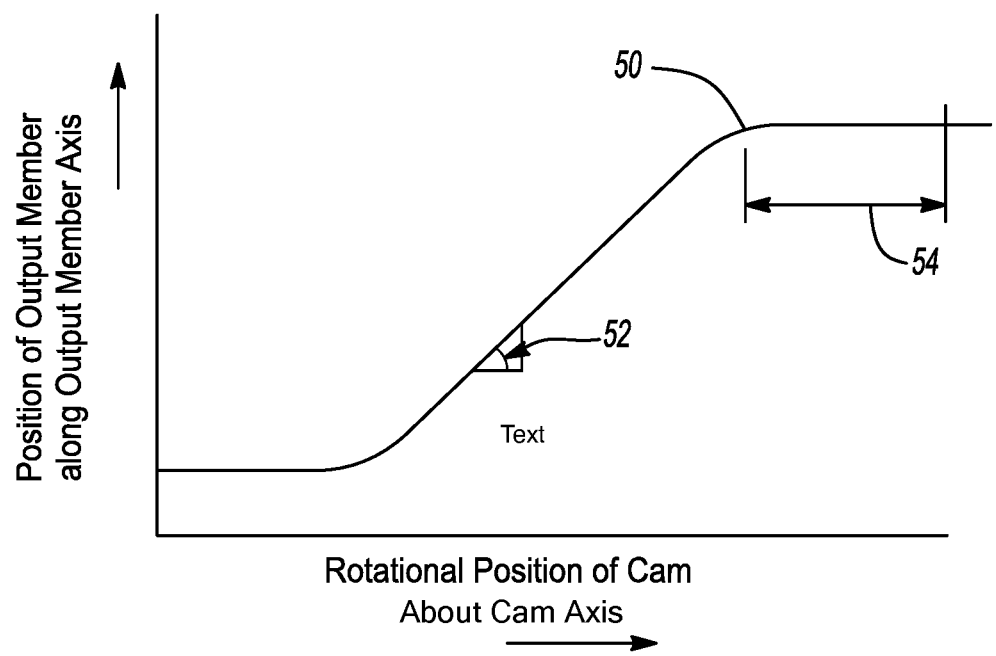
FIG. 3 is a plot depicting the position of the output member along the output member axis as a function of the rotational position of the cam about the cam axis.

The controller 18 is coupled to the first and second sensors 14 and 16 and receives the first and second sensor signals. With additional reference to FIG. 3, the controller 18 is configured to identify the positioning of the follower 32 at a predetermined point 50 on the lift portion 44 as the follower 32 is moved relative to the cam 30 along the lift portion 44 toward the second cam surface 42 based on a rate of change 52 in the position of the output member 24 along the output member axis 48 as a function of the rotational position of the cam 30 about the cam axis 36. Use of the rotational position of the cam 30 is preferred because it is insensitive to the rotational speed of the motor 26. Those of skill in the art will appreciate that the rotational speed of the motor 26 can vary as a function of the rotary load on the motor 26. In this regard, the rotational speed of the motor 26 may slow when the rotary load on the motor 26 increases and may increase when the rotary load on the motor 26 decreases.

The predetermined point 50 on the lift portion 44 can be identified by the controller 18 when the rate of change 52 is less than or equal to a predetermined threshold. The predetermined threshold can set to a predetermined value. Alternatively, the predetermined threshold can be a fraction, i.e., a number less than one (1), of a maximum value of the rate of change 52. The controller 18 can be configured to calculate the rate of change 52 on a regular basis, such as after rotation of the cam 30 through a predetermined angle of rotation or after the elapse of a predetermined amount of time. The rate of change 52 can be calculated in a conventional and instantaneous manner (i.e., the change in the position of the output member 24 divided by the change in the rotational position of the cam 30). It will be appreciated, however, that other methods can be used to determine the rate of change 52 and that such alternative methods could be configured to provide a desired level of signal filtering/noise reduction. For example, the rate of change 52 can be the average of several conventionally calculated (instantaneous) values of the rate of change that can be taken in a consecutive manner or spaced apart from one another by a predetermined angle of rotation. It will be appreciated that other techniques could be employed in the calculation of the rate of change 52, including the use of a weight function in conjunction with several conventionally calculated (instantaneous) values of the rate of change.

Figure 4A:
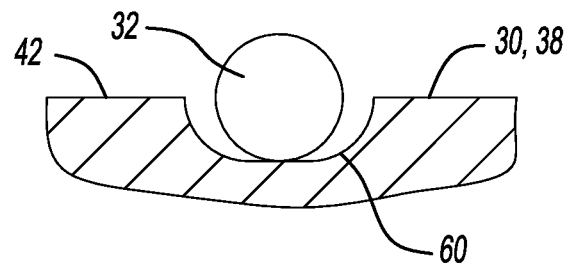
FIGS. 4A through 4E are views of a portion of the cam of the actuator device of FIG. 1 with optionally configured rest zones formed on a second cam surface.
Figure 4B:
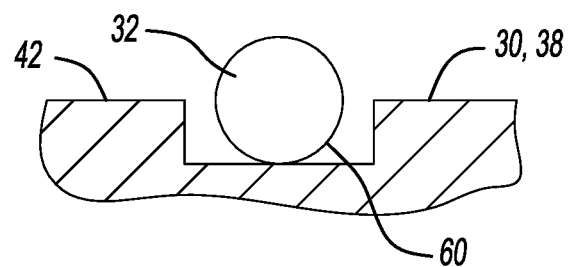
Figure 4C:
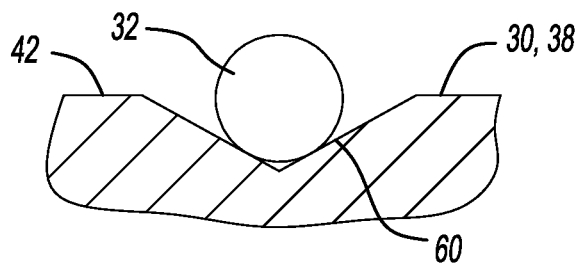
Figure 4D:
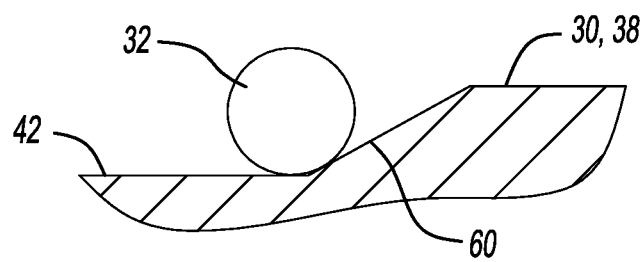
Figure 4E:
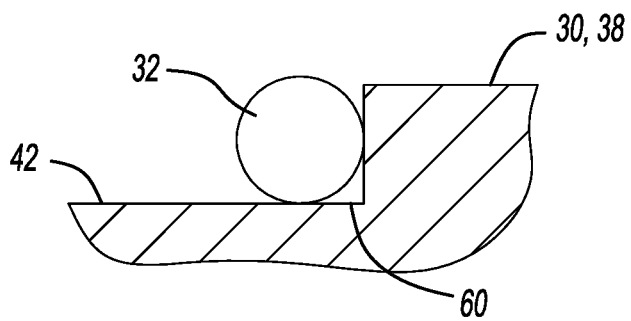

The controller 18 can be configured to operate the motor 26 to cause the cam 30 to be rotated in a first rotational direction when the follower 32 is moved relative to the cam 30 toward the second cam surface 42 and to halt rotation of the motor 26 and the cam 30 after the cam 30 has been rotated in the first rotational direction a predetermined amount 54 past the predetermined point 50. For example the predetermined amount 54 can be sufficient to place the follower 32 onto the second cam surface 42. With additional reference to FIGS. 4A through 4E, the predetermined amount 54 can be selected so as to position the follower 32 on an optional rest zone 60 on the second cam surface 42. The rest zone 60 can be configured to resist rotation of the cam 30 relative to the follower 32 in at least one rotational direction. In the examples of FIGS. 4A through 4C, the rest zones 60 are configured to resist rotation of the cam 30 relative to the follower 32 in two rotational directions, whereas in the examples of FIGS. 4D and 4E, the rest zones 60 are configured to resist rotation of the cam 30 relative to the follower 32 in a single rotational direction.

It will be appreciated that the controller 18 can cause the motor 26 to operate to rotate the cam 30 in a first rotational direction to drive the follower 32 relative to the cam 30 along the lift portion 44 toward the second cam surface 42. The controller 18 can determine the rate of change 52 in the position of the output member 24 along the output member axis 48 as a function of the rotational position of the cam 30 about the cam axis 36. The controller 18 can identify the positioning of the follower 32 on the lift portion 44 at a predetermined point 50 based on the rate of change 52. Optionally, the controller 18 can further rotate the cam 30 through a predetermined angle of rotation from the predetermined point 50 on the lift portion 44 to position the follower 32 at a desired location on the cam profile 38, such as on a rest zone 60 that is formed on the second cam surface 42. The predetermined point 50 can occur where the rate of change 52 becomes less than a predetermined threshold. Moreover, the predetermined threshold can be a variable that is based on a fraction of the maximum value of the rate of change 52.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method comprising:
providing an actuator assembly having a controller, wherein the controller coupled to a first sensor and a second sensor, and receives a first sensor signal and a second sensor signal, a cam and follower assembly and an output member, the cam and follower assembly comprising a cam and a follower, the cam being rotatable about a cam axis and defining a cam profile having a first cam surface, a second cam surface and a lift portion that connects the first and second cam surfaces, the follower being engaged to the cam profile, the cam and follower assembly being coupled to the output member, wherein the output member is positioned at a first axial position along an output member axis when the follower is disposed on the first cam surface, and wherein the output member is positioned at a second axial position along the output member axis when the follower is disposed on the second cam surface, the second axial position being offset from the first axial position along the output member axis, wherein the output member axis is co-extensive with the cam axis;
rotating the cam in a first rotational direction to drive the follower relative to the cam along the lift portion toward the second cam surface;
detecting, using the first sensor, a rotational position of the cam about the cam axis;
generating, using the first sensor, the first sensor signal indicative of the rotation position of the cam about the cam axis;
detecting, using the second sensor, a linear position of the output member along the output member axis;
generating, using the second sensor, the second sensor signal indicative of the linear position of the output member along the output member axis based on only a rate of change of axial movement of the output member; and
based on the first sensor signal and the second sensor signal, identifying the position of the follower on the lift portion at a predetermined point as the follower is moved relative to the cam along the lift portion, during rotational movement of the cam, toward the second cam surface based on a rate of change in the position of the output member along the output member axis as a function of the rotational position of the cam about the cam axis.

2. The method of claim 1, further comprising rotating the cam through a predetermined angle of rotation in the first rotational direction from the predetermined point on the lift portion.

3. The method of claim 1, wherein the first sensor signal is generated by a relative position sensor that is configured to sense only incremental rotation of the cam about the cam axis and is not configured to sense an absolute angular position of the cam about the cam axis relative to a stationary datum.

4. The method of claim 1, further comprising:
halting rotation of the cam after the cam has been rotated in the first rotational direction a predetermined amount past a point at which the predetermined point is identified.

5. The method of claim 4, wherein the follower is disposed on the second cam surface when the cam has been rotated in the first rotational direction by the predetermined amount past the point at which the predetermined point is identified.

6. The method of claim 5, wherein the follower is disposed in a rest zone on the second cam surface when the cam has been rotated in the first rotational direction by the predetermined amount past the point at which the predetermined point is identified, the rest zone being configured to resist rotation of the cam relative to the follower in at least one rotational direction.

7. The method of claim 1, wherein the predetermined point on the lift portion is identified when the rate of change is less than or equal to a predetermined threshold.

8. The method of claim 7, wherein the predetermined threshold is a fraction of a maximum value of the rate of change.

9. The method of claim 1, wherein the actuator assembly further comprises a motor that is configured to rotate the cam about the cam axis and wherein a controller is configured to control operation of the motor.

10. A method comprising:
providing an actuator assembly having a controller, wherein the controller coupled to a first sensor and a second sensor, and receives a first sensor signal and a second sensor signal, a cam and follower assembly and an output member, the cam and follower assembly comprising a cam and a follower, the cam defines a cam profile comprising a first cam surface, a second cam surface, and a lift portion that connects the first cam surface and the second cam surface, the cam being rotatable about a cam axis, the output member is positioned along an output member axis that is co-extensive with the cam axis when the follower is disposed on the cam;

receiving, from the first sensor, the first sensor signal indicative of a rotational position of the cam about the cam axis;

receiving, from the second sensor, the second sensor signal indicative of a linear position of the output member based on a rate of change of axial movement of the output member;

determining a rate of change in a position of the output member along the output member axis as a function of the rotational position of the cam about the cam axis; and identifying the positioning of a follower of the actuator assembly at a predetermined point as the follower is moved relative to the cam along the lift portion, during rotational movement of the cam, toward the second cam surface based on the rate of change in the position of the output member along the output member axis.

11. The method of claim 10, further comprising rotating the cam through a predetermined angle of rotation in the first rotational direction from the predetermined point on the lift portion.

12. The method of claim 10, wherein the predetermined point occurs where the rate of change is less than a predetermined threshold.

13. The method of claim 12, wherein the predetermined threshold is a fraction of a maximum value of the rate of change.

14. The method of claim 10, wherein the first sensor signal is received from a relative position sensor that is configured to sense only incremental rotation of the cam about the cam axis and is not configured to sense an absolute angular position of the cam about the cam axis relative to a stationary datum.

15. The method of claim 10, further comprising:
halting rotation of the cam after the cam has been rotated in the first rotational direction a predetermined amount past a point at which the predetermined point is identified.

16. The method of claim 15, wherein the follower is disposed on the second cam surface when the cam has been rotated in the first rotational direction by the predetermined amount past the point at which the predetermined point is identified.

* * * * *